(No Model.)
J. HIMES.
DEVICE FOR PREVENTING END MOTION IN SHAFTS OR SPINDLES.
No. 580,692. Patented Apr. 13, 1897.
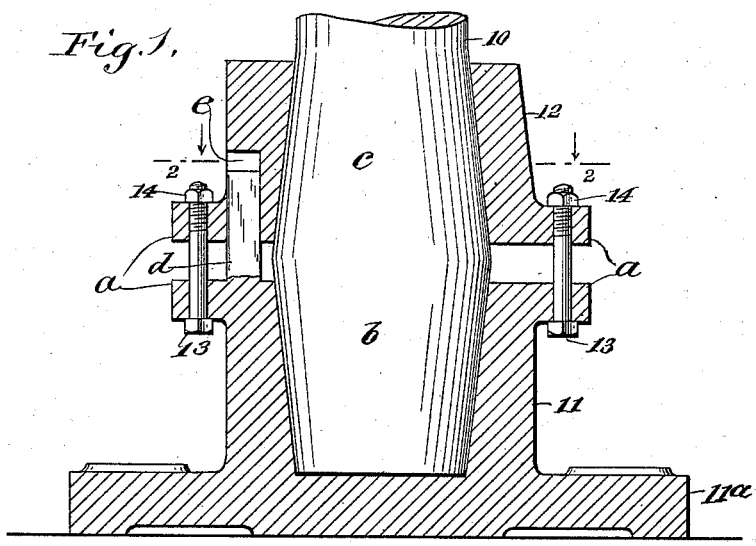
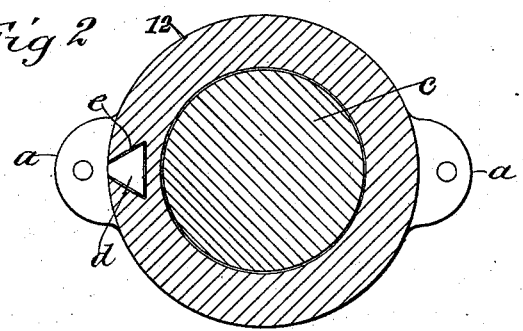
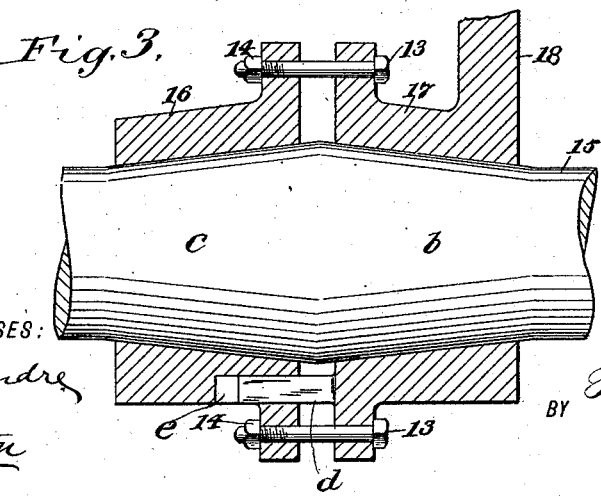
WITNESSES:
L. N. Legendre
Wm. A. Patton
INVENTOR
J. Himes
BY
ATTORNEYS.

UNITED STATES PATENT OFFICE.

JOSEPH HIMES, OF PORT BLAKELY, WASHINGTON.

DEVICE FOR PREVENTING END MOTION IN SHAFTS OR SPINDLES.

SPECIFICATION forming part of Letters Patent No. 580,692, dated April 13, 1897.

Application filed May 26, 1896. Serial No. 593,172. (No model.)

*To all whom it may concern:*

Be it known that I, JOSEPH HIMES, of Port Blakely, in the county of Kitsap and State of Washington, have invented a new and Improved Device for Preventing End Motion in Shafts or Spindles, of which the following is a full, clear, and exact description.

Line-shafting and upright spindles in motion are, when supported in the usual manner, liable to move more or less in a longitudinal direction, which movement in many cases is detrimental to the correct operation of other mechanism connected with said shafting or spindles.

The object of this invention is to provide novel and efficient means that will check end motion in shafts or spindles and be adapted for convenient adjustment to take up lost motion due to wear.

My invention consists in the construction and combination of parts, as is hereinafter described, and indicated in the claims.

Reference is to be had to the accompanying drawings, forming a part of this specification, in which similar characters of reference indicate corresponding parts in all the figures.

Figure 1 is a sectional side view of the improved device applied for support of an upright spindle. Fig. 2 is a sectional plan view substantially on the line 2 2 in Fig. 1, the base being removed; and Fig. 3 is a sectional side view showing the improvement adapted for preventing end motion in a horizontal shaft.

In Fig. 1, 10 represents the lower end of a cylindric spindle, which is to be supported free to rotate and be prevented from a vertical jumping movement when in service.

The spindle-support that embodies features of the invention comprises the step-block 11 and the cap-sleeve 12. As shown, the step-block 11 is formed with a body that may be cylindrical or of other form exteriorly, having a flanged base 11$^a$ to adapt it for attachment to a stable support, or the base mentioned may in some cases be dispensed with and other means be provided to secure the block 11 in a vertical position. The cap-sleeve 12 and step-block 11 are furnished with lateral ears $a$ or equivalent projections, which are oppositely perforated to receive the connecting-bolts 13, having nuts 14 thereon. The end portion of the spindle 10 is swelled at a correct distance from the lower extremity, and preferably said swelled portion is in the form of two similar integral cone-frustums that join at their widest ends, as clearly shown in Fig. 1.

The lower cone-frustum $b$ of the spindle end has a running bearing in a socket produced in the step-block 11, and the cap-sleeve 12 is formed in its base to fit on the upper cone-frustum $c$ of said spindle end. When adjusted for service the cap-sleeve 12 is drawn into loose engagement with the spindle by the bolts 13 and nuts 14.

It will be evident that if the bearing-surfaces of the engaged parts which have been described are properly lubricated the spindle 10 will be permitted to rotate freely and be held from an improper vertical reciprocation in its supporting step-block 11.

In Fig. 3 the shaft portion 15 is shown as having a coniform swell produced on it by the integral formation therewith of the two similar cone-frustums $b$ $c$, and this double-cone formation may be located at any point in the length of a line of shafting. The improvement as applied to a line-shaft 15 comprises two coniform sleeves 16 17, substantially similar with the coniform sleeve 12, but one of the shaft-supporting sleeves 17 has a projecting arm 18 formed or secured to it, as shown in part in Fig. 2.

The arm 18 may be in the form of a hanger or a side bracket which has stable connection with a suitable support for the shafting, so that when the sleeve-pieces 16 17 are properly coupled together by the bolts 13 and nuts 14, as shown, the shaft 15 will be permitted to freely rotate and be prevented from longitudinal movement.

In both forms illustrating different applications of the improvement the coniform sleeves 12 16 and corresponding parts 11 17 are in pairs, slidably connected by the tongue-and-groove formation, (best shown in Fig. 2,) the tongue-piece $d$ loosely engaging with the slot $e$, as shown. The tongue is projected from one of each pair of sleeves and enters the groove in the other sleeve, so that while longitudinal adjustment is permitted the tongue when interlocked with the groove will prevent a rotative movement of either sleeve.

Having thus fully described my invention, I claim as new and desire to secure by Letters Patent—

1. The combination of a step-block having a horizontal base-flange and an upwardly-flaring seat, a cap-sleeve having a downwardly-flaring seat registering with the seat in the step-block, means for holding the step-block and sleeve together, and a tongue projecting upward from the step-block and sliding in a longitudinal slot in the cap-sleeve whereby to prevent the turning of the cap-sleeve on the step-block, substantially as described.

2. In a bearing, the combination of two members having interior seats or openings flaring toward each other, means for securing the members together, a tongue projecting longitudinally from one member and sliding in a longitudinal slot in the remaining member, and a part projecting from one member by which part the bearing may be supported, the tongue serving to prevent independent axial movement of the member not having the projecting part, substantially as described.

JOSEPH HIMES.

Witnesses:
  EDWARD H. LINCOLN,
  MICHAEL MARTIN.